(12) United States Patent
Fukano

(10) Patent No.: US 6,390,445 B2
(45) Date of Patent: May 21, 2002

(54) SOLENOID-OPERATED VALVE

(75) Inventor: Yoshihiro Fukano, Ibaraki-ken (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/809,139

(22) Filed: Mar. 16, 2001

(30) Foreign Application Priority Data

Mar. 17, 2000 (JP) ........................................ 2000-077194

(51) Int. Cl.[7] ............................................... F16K 31/02
(52) U.S. Cl. ............................. 251/129.19; 251/129.15
(58) Field of Search ...................... 251/129.15, 129.19, 251/64

(56) References Cited

U.S. PATENT DOCUMENTS

| | | | | |
|---|---|---|---|---|
| 2,812,776 A | * | 11/1957 | Lofftus et al. | ......... 251/129.01 |
| 5,246,199 A | * | 9/1993 | Numoto et al. | ......... 251/129.15 |
| 5,467,961 A | * | 11/1995 | Sausner et al. | ......... 251/129.15 |
| 5,503,366 A | * | 4/1996 | Zabeck et al. | ......... 251/129.15 |
| 6,019,344 A | * | 2/2000 | Engel et al. | ............ 251/129.01 |

\* cited by examiner

*Primary Examiner*—Henry C. Yuen
*Assistant Examiner*—John Bastianelli
(74) *Attorney, Agent, or Firm*—Paul A. Guss

(57) ABSTRACT

A solenoid-operated valve has a disk-shaped member connected to one end of a movable iron core, for integrally interlocking the movable iron core; and a lining member formed of an elastic material for covering the disk-shaped member; wherein when a solenoid section is in a non-excited state, only a part of a projection formed on the lining member contacts with a lower surface of a ring member, and when the solenoid section is excited, a contact area of the projection with respect to the ring member is gradually increased.

7 Claims, 3 Drawing Sheets

SOLENOID-OPERATED VALVE

BACKGROUND OF THE INVENTION

1. Field of the Invention

The present invention relates to a solenoid-operated valve which makes it possible to avoid any abutment sound during the operation and maintain quietness.

2. Description of the Related Art

A solenoid-operated valve has been hitherto used to control the flow direction of compressed air, for example, by supplying the compressed air to an actuator or discharging the compressed air to the atmospheric air.

Such a solenoid-operated valve concerning the conventional technique generally adopts a system in which a valve plug is operated by means of a solenoid (electromagnet). The solenoid-operated valve comprises, for example, an unillustrated fixed iron core, a coil, and a movable iron core.

In this arrangement, the attracting force is generated by applying an electric power to the coil. The movable iron core is displaced by the attracting force, and thus the valve plug is operated.

However, the solenoid-operated valve concerning the conventional technique as described above involves the following inconvenience. That is, when the electric power is applied to the coil to displace the valve plug, or when the electric power application to the coil is stopped to restore the valve plug to the original position, then the valve plug or a member to make displacement integrally with the valve plug collides with another member, and the abutment sound is generated.

Further, another inconvenience arises as follows. That is, the movable iron core is displaced in accordance with the attracting action of the coil, and the movable iron core abuts against the fixed iron core. As a result, the abutment sound is generated.

SUMMARY OF THE INVENTION

A general object of the present invention is to provide a solenoid-operated valve which makes it possible to maintain quietness by avoiding any generation of abutment sound during the operation of the solenoid-operated valve.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
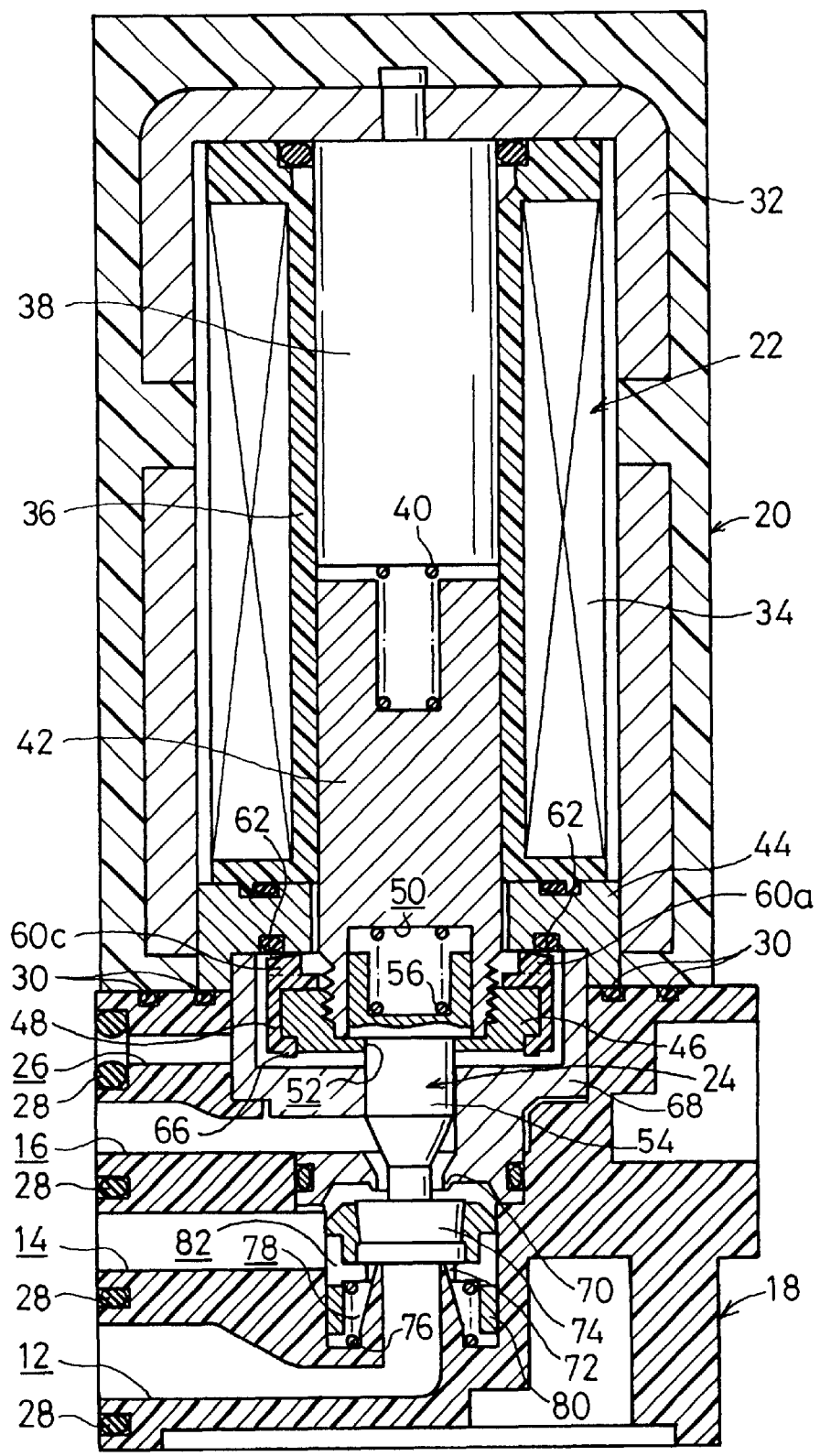
FIG. 1 shows a vertical sectional view taken in an axial direction illustrating a solenoid-operated valve according to an embodiment of the present invention.

In FIG. 1, reference numeral 10 indicates a solenoid-operated valve according to an embodiment of the present invention.

The solenoid-operated valve 10 comprises a valve body 18 which is formed with a pressure fluid supply port 12, a pressure fluid discharge port 14, and a discharge port 16; a bottom-equipped cylindrical bonnet 20 which is integrally w connected to a side surface portion of the valve body 18; a solenoid section 22 which is arranged at the inside of the bonnet 20; and a valve mechanism section 24 which switches the communication state between the respective ports in accordance with the action of the solenoid section 22.

Reference numeral 26 indicates a port which communicates with the atmospheric air for discharging the air in the valve body 18 to the outside. Seal members 28 are installed to the pressure fluid supply port 12, the pressure fluid discharge port 14, the discharge port 16, and the port 26 respectively. Seal members 30 are also allowed to intervene between the valve body 18 and the bonnet 20.

The solenoid section 22 includes a cap member 32 which is internally fitted to the inside of the bonnet 20 and which is formed to have a bottom-equipped cylindrical configuration; a bobbin 36 which is arranged at the inside of the cap member 32 and around which a coil 34 is wound; a fixed iron core 38 which has its first end connected to the cap member 32; a movable iron core 42 which is arranged coaxially with the fixed iron core 38 and which is urged in a direction to make separation in accordance with the action of the resilient force of a first spring member 40 interposed between the fixed iron core 38 and the movable iron core 42; and a ring member 44 which surrounds a part of the outer circumferential surface of the movable iron core 42.

The valve mechanism section 24 includes a disk-shaped member (interlocking member) 46 which is screw-fastened to a first end of the movable iron core 42 in the axial direction; a lining member 48 which is formed of an elastic material such as rubber for covering the outer circumferential surface of the disk-shaped member 46; a displacement member 54 which is integrally formed with a cylindrical section to be inserted into a hole 50 of the movable iron core 42 and an extended section to slide along a central hole 52 of the disk-shaped member 46; and a second spring member 56 which is arranged in the hole 50 of the movable iron core 42 and which is interposed between the movable iron core 42 and the displacement member 54.

Figure 3:
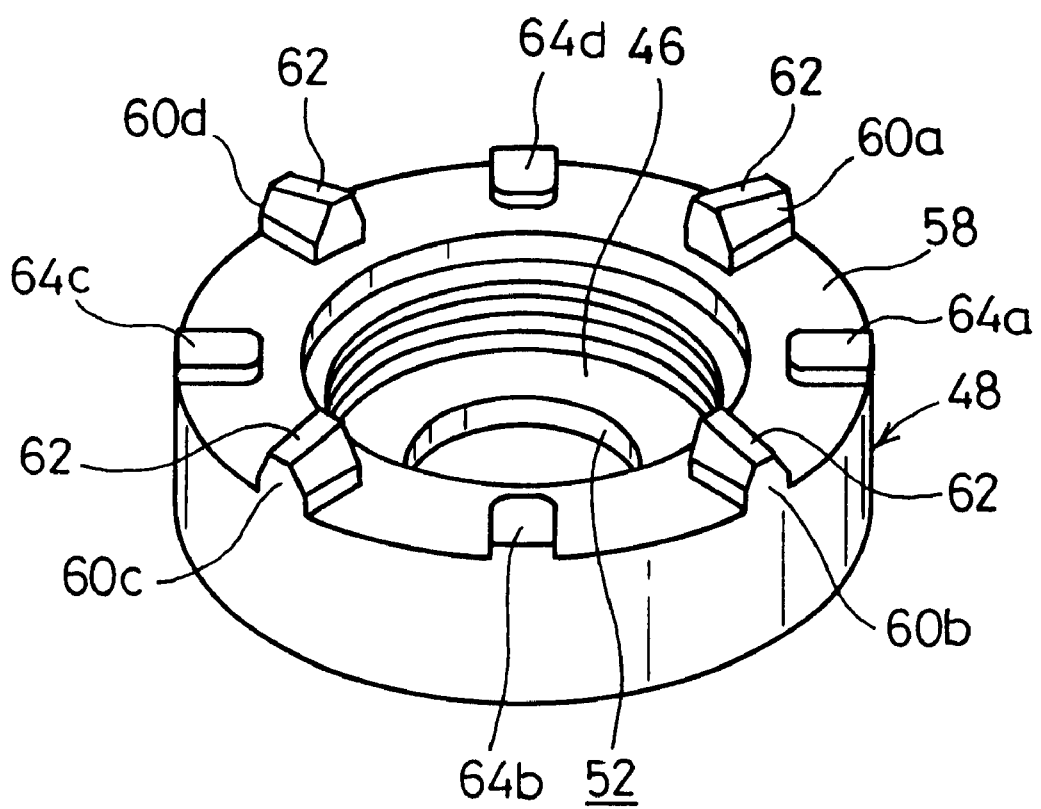
FIG. 3 shows a perspective view illustrating a lining member which constitutes the solenoid-operated valve shown in FIG. 1.

As shown in FIG. 3, the lining member 48 is formed to have a substantially cylindrical configuration. Four projections 60a to 60d, which are separated with each other by angles of about 90 degrees in the circumferential direction, are formed on an annular surface 58 of the lining member 48. An inclined surface 62, which gently slants downwardly from a central portion in a radially outward direction, is formed on an upper surface of each of the projections 60a to 60d. Protrusions 64a to 64d, each of which has a substantially rectangular cross section and each of which has a size in the height direction formed to be lower than that of the projection 60a to 60d, are provided between the adjoining projections 60a to 60d. As shown in FIG. 1, an annular protrusion 66 is integrally formed at the bottom surface of the lining member 48.

The valve mechanism section 24 further includes a retainer 68 which is secured to the inside of the valve body 18 and which is formed with a hole for surrounding the extended section of the displacement member 54; a poppet valve 74 which is to be seated on an upper seat section 70 formed on the retainer 68 and a lower seat section 72 formed on the valve body 18 respectively; and a third spring member 76 which presses the poppet valve 74 upwardly. A guide section 80, which is slidable along a valve chamber 78 formed at the inside of the valve body 18, is connected to the poppet valve 74. The guide section 80 is formed with a passage 82 for making communication between the pressure fluid supply port 12 and the pressure fluid discharge port 14.

In this arrangement, when the poppet valve 74 is separated from the lower seat section 72, the pressure fluid supply port 12 and the pressure fluid discharge port 14 are communicated with each other. When the poppet valve 74 is seated on the lower seat section 72, the communication state is blocked. When the poppet valve 74 is separated from the upper seat section 70, the pressure fluid, which remains in the valve chamber 78, is discharged to the outside via the discharge port 16. When the poppet valve 74 is seated on the upper seat section 70, the discharge state is intercepted.

The first end of the extended section of the displacement member 54, which is formed so that the diameter is reduced along with a substantially tapered configuration, and the upper surface of the poppet valve 74 are formed in a separate manner so that they are capable of making abutment or separation.

The solenoid-operated valve 10 according to the embodiment of the present invention is basically constructed as described above. Next, its operation, function, and effect will be explained.

FIG. 1 shows the OFF state which resides in the non-excited state with no current supplied to the coil 34 and in which the poppet valve 74 is seated on the lower seat section 72 to block the communication between the pressure fluid supply port 12 and the pressure fluid discharge port 14.

The spring constants of the first spring member 40 and the second spring member 56 are set so that parts of the inclined surfaces 62 of the projections 60a to 60d of the lining member 48 contact with the lower surface of the ring member 44 in the OFF state. Therefore, a predetermined clearance is formed between the annular protrusion 66 at the bottom surface of the lining member 48 and the inner wall surface of the retainer 68 to give a non-contact state. The protrusions 64a to 64d, which are formed between the adjoining projections 60a to 60d, are constructed so as to give the non-contact state with respect to the lower surface of the ring member 44 in the OFF state.

Figure 2:
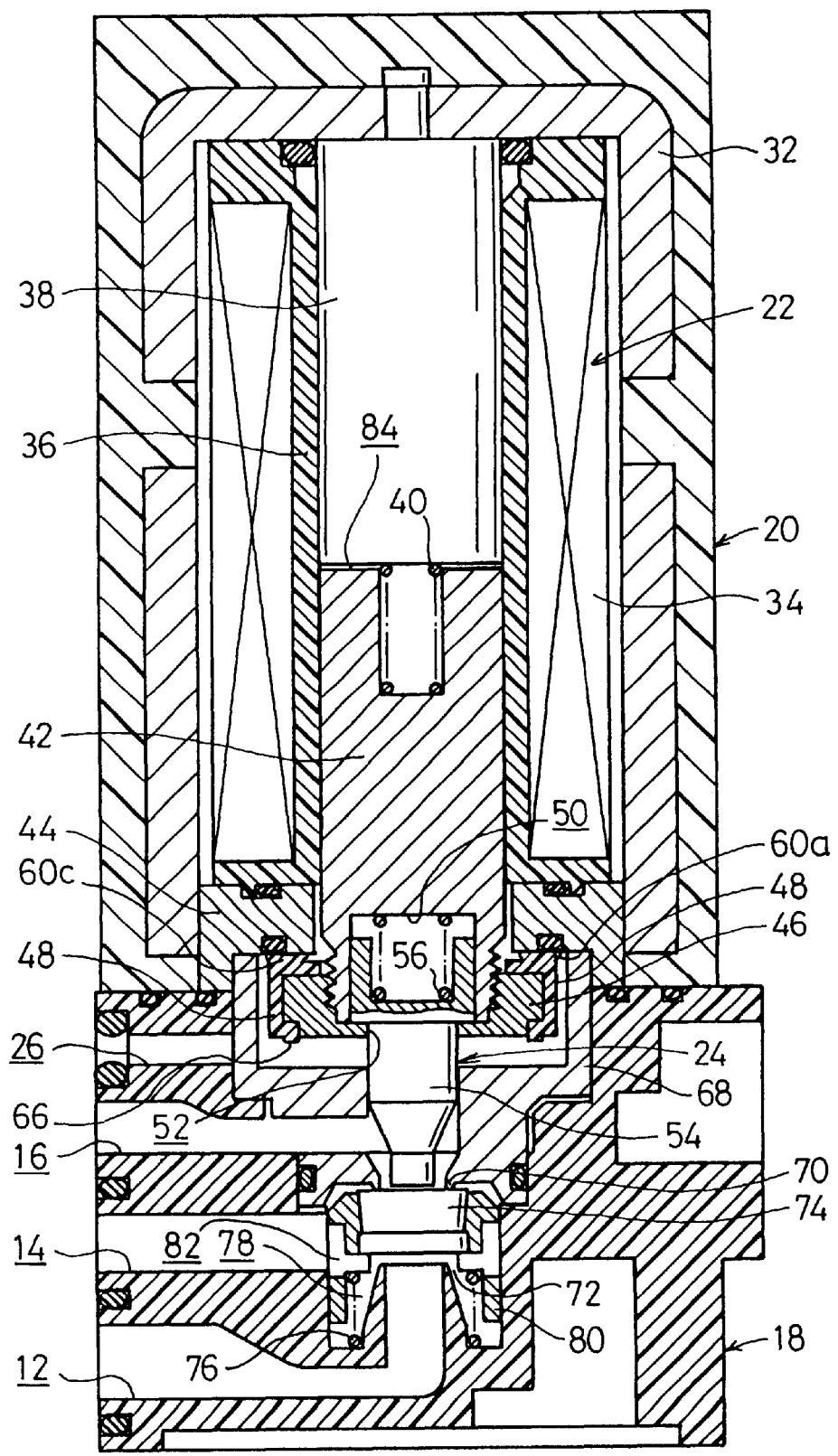
FIG. 2 illustrates the operation depicting the ON state after being switched from the OFF state shown in FIG. 1.

When an unillustrated power source is energized to apply the electric power to the coil 34 in the OFF state as described above, the coil 34 is magnetically excited. The movable iron core 42 is attracted toward the fixed iron core 38 in accordance with the magnetically exciting action. As shown in FIG. 2, the solenoid-operated valve 10 is switched from the OFF state to the ON state.

That is, the movable iron core 42 is displaced by a minute distance toward the fixed iron core 38. The disk-shaped member 46, the lining member 48, and the displacement member 54 are moved upwardly integrally with the movable iron core 42. Therefore, the poppet valve 74 is separated from the lower seat section 72 in accordance with the action of the resilient force of the third spring member 76. Accordingly, as shown in FIG. 2, the ON state is given, in which the pressure fluid supply port 12 and the pressure fluid discharge port 14 are communicated with each other. As a result, the pressure fluid, which is introduced from the pressure fluid supply port 12, is led into the valve chamber 78 via the gap between the poppet valve 74 and the lower seat section 72. Further, the pressure fluid is supplied to an unillustrated fluid-operated apparatus via the passage 82 and the pressure fluid discharge port 14.

When the solenoid-operated valve 10 is in the ON state, the upper surface of the poppet valve 74 is seated on the upper seat section 70 in accordance with the action of the resilient force of the third spring member 76. Therefore, the communication state between the valve chamber 78 and the discharge port 16 is intercepted, and the discharge of the pressure fluid to the outside is stopped.

When the lining member 48 is moved upwardly integrally with the movable iron core 42, the inclined surfaces 62 of the projections 60a to 60d are elastically deformed while gradually making contact with the ring member 44. Finally, the movable iron core 42 and the lining member 48 are displaced in an integrated manner until the solenoid section 22 is in the ON state.

Therefore, in the embodiment of the present invention, the parts of the inclined surfaces 62 of the projections 60a to 60d are in the state of contact with the ring member 44 in the OFF state. When the OFF state is switched into the ON state, then the contact areas of the inclined surfaces 62 of the projections 60a to 60d with respect to the lower surface of the ring member 44 are gradually increased, and the projections 60a to 60d are elastically deformed. Accordingly, it is possible to avoid any generation of the abutment sound which would be otherwise caused upon the abutment of the lining member 48 against the ring member 44. Thus, it is possible to maintain quietness.

In other words, when the solenoid section 22 is switched from the OFF state to the ON state or from the ON state to the OFF state, the projections 60a to 60d of the lining member 48 interposed between the ring member 44 and the disk-shaped member 46 effect the buffering action. Accordingly, the disk-shaped member 46 does not make direct contact with the ring member 44, and no abutment sound is generated. Further, the annular protrusion 66 of the lining member 48 is allowed to intervene between the disk-shaped member 46 and the retainer 68. Accordingly, the disk-shaped member 46 does not make direct contact with the retainer 68, and no abutment sound is generated.

When the solenoid section 22 is in the ON state, the elastically deformed projections 60a to 60d and the protrusions 64a to 64d formed between the adjoining projections 60a to 60d finally contact with the lower surface of the ring member 44 respectively to arrive at the displacement terminal end position.

When the solenoid section 22 is in the ON state, the minute clearance 84 is formed between the fixed iron core 38 and the movable iron core 42 (see FIG. 2) so that the fixed iron core 38 and the movable iron core 42 make no contact with each other. The size of the movable iron core 42 in the axial direction is highly accurately set beforehand so that the clearance is formed between the fixed iron core 38 and the movable iron core 42 when the ON state is given. Therefore, it is possible to avoid any generation of the abutment sound between the fixed iron core 38 and the movable iron core 42. Thus, it is possible to maintain quietness.

When the electric power application to the coil 34 is stopped to switch the solenoid-operated valve 10 from the ON state to the OFF state, the movable iron core 42 is moved downwardly in accordance with the action of the resilient force of the first spring member 40 which functions as a restoring spring. Therefore, the disk-shaped member 46, the lining member 48, and the displacement member 54 are displaced integrally with the movable iron core 42. The first end of the displacement member 54 presses the poppet valve 74 downwardly. Accordingly, the poppet valve 74 is seated on the lower seat section 72 to give the OFF state. When the first end of the displacement member 54 abuts against the upper surface of the poppet valve 74, the shock, which is caused upon the abutment, is absorbed by the second spring member 56. Thus, a buffering function is effected.

The spring constants of the first spring member 40 and the second spring member 56 are previously set so that the clearance is formed between the annular protrusion 66 of the lining member 48 and the inner wall surface of the retainer 68, and the annular protrusion 66 of the lining member 48 and the inner wall surface of the retainer 68 make no abutment, when the solenoid-operated valve 10 is switched from the ON state to the OFF state. Therefore, when the solenoid-operated valve 10 is switched from the ON state to the OFF state, it is possible to avoid any generation of the abutment sound between the lining member 48 and the retainer 68. Thus, it is possible to maintain quietness.

As described above, in the embodiment of the present invention, it is possible to avoid any generation of the abutment sound and maintain quietness in any one of the operation states brought about when the solenoid-operated valve 10 is switched from the OFF state to the ON state and when the solenoid-operated valve 10 is switched from the ON state to the OFF state. Therefore, the solenoid-operated valve according to the embodiment of the present invention can be preferably used, for example, in an environment such as those in hospitals and acoustic facilities in which it is required to maintain quietness.

What is claimed is:

1. A solenoid-operated valve with a valve plug to be displaced by attracting a movable iron core in accordance with an exciting action of a solenoid, said solenoid-operated valve comprising:

an interlocking member connected to one end of said movable iron core, for integrally interlocking said movable iron core; and a lining member formed of an elastic material for covering said interlocking member, wherein:

when said solenoid is in a non-excited state, only a part of a projection formed on said lining member contacts with a solenoid-side without sealing, and when said solenoid is excited, a contact area of said projection with respect to said solenoid-side member is gradually increased without sealing.

2. The solenoid-operated valve according to claim 1, wherein an inclined surface, which is inclined radially outwardly from a central portion, is formed on said projection of said lining member.

3. The solenoid-operated valve according to claim 1, further comprising a first spring member interposed between a fixed iron core and said movable iron core, for urging said movable iron core in a direction to make separation from said fixed iron core; and a second spring member interposed between said movable iron core and said interlocking member, for urging said movable iron core in a direction to make approach to said fixed iron core; wherein spring constants of said first spring member and said second spring member are set so that only said part of said projection formed on said lining member contacts with said solenoid-side member when said solenoid is in said non-excited state.

4. The solenoid-operated valve according to claim 2, wherein a plurality of said projections are formed in a circumferential direction while being separated from each other by predetermined angles.

5. The solenoid-operated valve according to claim 4, wherein protrusions, each of which has a size in a height direction defined to be lower than that of said projection, are provided between said adjoining projections; and wherein said protrusions do not contact with said solenoid-side member when said solenoid is in said non-excited state, while said protrusions abut against said solenoid-side member when said solenoid is in an excited state.

6. The solenoid-operated valve according to claim 2, wherein said lining member has an annular protrusion which is integrally formed on a surface disposed on a side opposite to a surface on which said projection is formed.

7. The solenoid-operated valve according to claim 3, wherein a clearance is provided between said fixed iron core and said movable iron core which is displaceable by being attracted by said solenoid, when said solenoid is in an excited state.

\* \* \* \* \*